United States Patent [19]
Po

[11] Patent Number: 6,135,143
[45] Date of Patent: Oct. 24, 2000

[54] AIR VALVE FOR AN INFLATABLE ARTICLE

[75] Inventor: Tsai Long Po, Tamshui Taipei, Taiwan

[73] Assignee: Ho Lee Co., Ltd., Taipei, Taiwan

[21] Appl. No.: 09/186,066

[22] Filed: Nov. 5, 1998

[51] Int. Cl.[7] .................................................. F16K 15/00
[52] U.S. Cl. ..................................... 137/512.15; 137/522
[58] Field of Search .................................... 137/522, 523, 137/512, 15; 417/562

[56] References Cited

U.S. PATENT DOCUMENTS

| | | | |
|---|---|---|---|
| 4,222,407 | 9/1980 | Ruschke et al. .................... | 137/512.15 |
| 5,074,765 | 12/1991 | Pekar ...................................... | 417/480 |
| 5,343,889 | 9/1994 | Jaw ........................................ | 137/523 |
| 5,862,843 | 1/1999 | Corbitt, III .............................. | 137/223 |

FOREIGN PATENT DOCUMENTS 549521  12/1957  Canada .............................. 137/512.15

*Primary Examiner*—Timothy S. Thorpe
*Assistant Examiner*—Michael K. Gray
*Attorney, Agent, or Firm*—Donald C. Casey, Esq.

[57] ABSTRACT

An air valve includes a valve body having an air passage and a transverse bar suspended in the air passage, a valve flap coupled to said transverse bar at a bottom side to close said air passage, and a movable plate coupled to locating blocks at said transverse bar at a top side and moved vertically between a first position where the movable plate is released from the valve flap and the air passage is closed by the valve flap, and a second position where the valve flap is deformed by the movable plate to open the air passage for letting air pass.

4 Claims, 4 Drawing Sheets

AIR VALVE FOR AN INFLATABLE ARTICLE

BACKGROUND OF THE INVENTION

The present invention relates to an air valve for an inflatable article, and more particularly to such an air valve of which the valve body can easily operated to close/open the air passage, enabling the inflatable article in which the air valve is installed to be quickly inflated or exhausted.

Regular inflatable articles such as life buoys, rubber boats, inflatable toys, etc., are commonly equipped with an air valve. Through the air valve, an inflatable article can be inflated with a hand pump, foot pump, or any of a variety of air pumping means. FIG. 1 shows an air valve for this purpose. The air valve comprises a valve block 10, a plug member 11, and a screw cap 12. The valve block 10 is shaped like a cup, having an outward peripheral flange 101 around the periphery at the top for fastening to an inflatable article by a high frequency sealing apparatus, and a threaded inside tube axially suspended on the inside and defining an air passage 102. The plug member 11 is plugged into the inside tube to seal the air passage. The screw cap 12 is threaded onto the threaded inside tube to hold the plug member 11 in place. This structure of air valve is complicated in use. Before pumping air into the inflatable article, the screw cap 12 must be disconnected from the threaded inside tube of the valve block 10, and then the plug member 11 must be removed from the threaded inside tube of the valve block 10. After the inflatable article has been inflated, the plug member 11 and the screw cap 12 must be installed again. FIG. 2 shows another structure of air valve according to the prior art. This structure of air valve comprises a valve block 20, a cylindrical valve body 21 mounted in the valve block 20, a valve flap 211 mounted in a center mounting hole at the center of the closed bottom side wall of the valve body 21, and a cover plate 22 threaded onto the valve body 21 to close the air passage. When forced air is driven through the valve body 21, the valve flap 211 is forced downwards to open the air holes at the bottom side wall of the valve body 21, for permitting forced air to pass to the inside of the inflatable article. When external force is disappeared, the valve flap 211 is forced by the inside air pressure of the inflatable article to close the air holes of the valve body 21. This structure of air valve is still not satisfactory in use. One drawback of this structure of air valve is that the valve flap 211 wears quickly with the use of the air valve. Another drawback of this structure of air valve is that the cover plate 22 must be disconnected from the valve body 21 when exhausting the inflatable article.

SUMMARY OF THE INVENTION

The present invention provides an air valve for an inflatable article which eliminates the aforesaid drawbacks. According to one embodiment of the present invention, the air valve comprises a valve body shaped like a short tube, a valve flap, and a valve cover for covering on the valve body. The valve body comprises an outside annular flange perpendicularly raised around the periphery thereof on the middle for fastening to an inflatable article, an inside annular flange raised around an inside wall thereof on the middle and defining an air passage, a transverse bar suspended in the inside annular flange, a plurality of mounting holes spaced at the transverse bar, and pairs of locating blocks symmetrically arranged at two opposite sides of the transverse bar. The valve flap is coupled to the valve body to close the air passage of the valve body, comprising a plurality of upright mounting rods arranged in a line corresponding to the transverse bar and respectively tightly plugged into the mounting holes at the transverse bar of the valve body from a bottom side, and a transverse bottom groove at a bottom surface thereof corresponding to the transverse bar of the valve body. The movable plate is coupled to the locating blocks of the valve body and moved up and down within a limited distance, having a plurality of vertical sliding slots symmetrically arranged at two opposite side walls thereof and respectively coupled to the locating blocks at the transverse bar of the valve body. The valve flap is deformed by the movable plate to open the air passage when the movable plate is forced downwards toward the transverse bar by an external force. The valve flap immediately returns to its former shape when the external force is released from the movable plate, causing the air passage to be closed.

DETAILED DESCRIPTION OF THE PREFERRED EMBODIMENT

Figure 1:
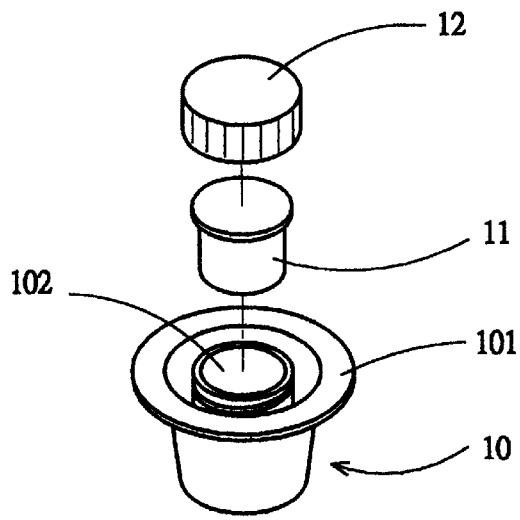
FIG. 1 is an exploded view of an air valve for an inflatable article according to the prior art.
Figure 2:
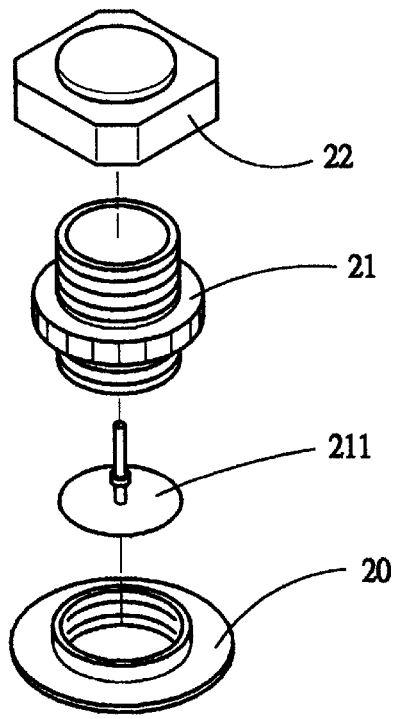
FIG. 2 is an exploded view of another structure of air valve for an inflatable article according to the prior art.
Figure 3:
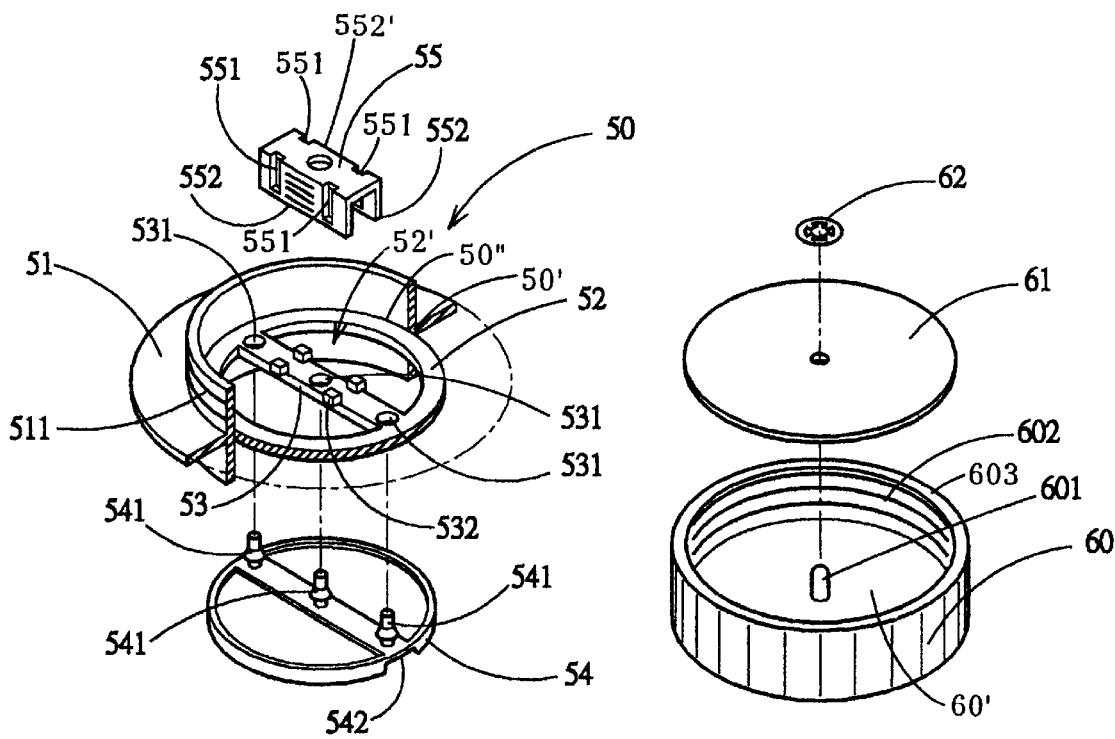
FIG. 3 is an exploded view of an air valve for an inflatable article according to the present invention.

Referring to FIG. 3, an air valve for an inflatable article is generally comprised of a valve body 50, a valve flap 54, a movable plate 55, and a valve cover 60.

The valve body 50 is shaped like a short tube, comprising an outside annular flange 51 extending perpendicularly around the periphery on the middle or central portion 50 for fastening to an inflatable article, an inside annular flange 52 raised around the inside wall thereof on the middle 50" defining an air passage 52', an outer thread 511 around the periphery above the outside annular flange 51, a transverse bar 53 suspended in the inside annular flange 52, a plurality of mounting holes 531 spaced along the length of the transverse bar 53 on the middle, and pairs of locating blocks 532 arranged at two opposite sides of the transverse bar 53.

The valve flap 54 is a rubber flap fitting the inner diameter of the valve body 50, having a plurality of upright mounting rods 541 respectively tightly plugged into the mounting holes 531 at the transverse bar 53 of the valve body 50 from the bottom side, and a transverse bottom groove 542 at the bottom surface 542' thereof corresponding to the transverse bar 53 of the valve body 50. The transverse bottom groove 542 diminishes the wall thickness of a part of the valve flap 54, enabling the valve flap 54 to be alternatively set between the extended position (see FIG. 4A), and the folded position (see FIG. 4B).

The movable plate 55 has a substantially channel-shaped cross section, and a plurality of vertical sliding slots 551 arranged at two opposite sides 552 and 552' and respectively coupled to the locating blocks 532 at the transverse bar 53 of the valve body 50. When installed, the movable plate 55 can be moved up and down within a limited distance (see FIGS. 4A and 4B).

The valve cover 60 comprises a top 60' an inner thread 602 for engagement with the outer thread 511 of the valve body 50, a center rod 601 connected to top 60' at the center of the inside wall 603 thereof. Further, a gasket 61 is mounted in the valve cover 60, and secured to the center rod 601 by a clamp 62.

Figures 4A, 4B:
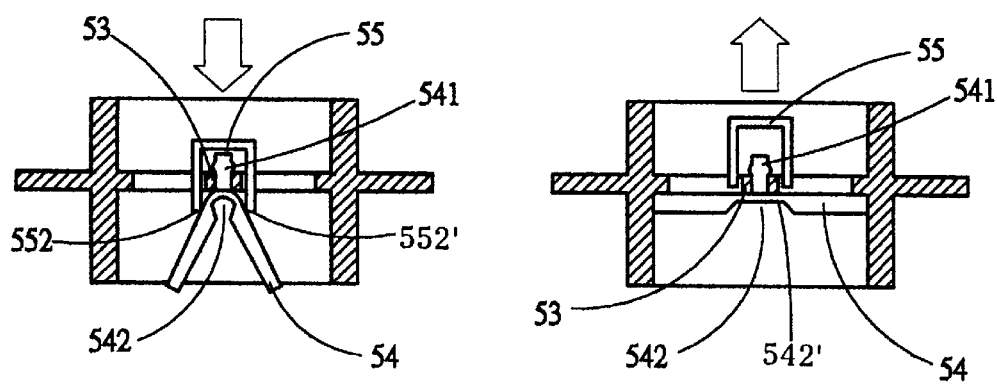
FIG. 4A is a sectional view of the present invention, showing the air passage of the valve body closed.
FIG. 4B is similar to FIG. 4A but showing the valve flap deformed, the air passage of the valve body opened.

Referring to FIGS. 4A and 4B, when the movable plate 55 is lifted (see FIG. 4A) and released from the valve flap 54, the valve flap 54 is immediately returned to the extended position (due to the effect of the rubber material property) to let forced air pass through the valve body 50 to the inside of the inflatable article to which the valve body 50 is fastened, and to prohibit air pressure from escaping out of the inflatable article through the valve body 50. When the movable plate 55 is forced downwards, the valve flap 54 is downwardly folded to open the air passage through the inner diameter of the inside annular flange 52 (see FIG. 4B), enabling the inside pressure of the inflatable article to be exhausted. Therefore, the air passage of the valve body 50 can be conveniently opened/closed by lowering/releasing the movable plate 53.

Figure 5:
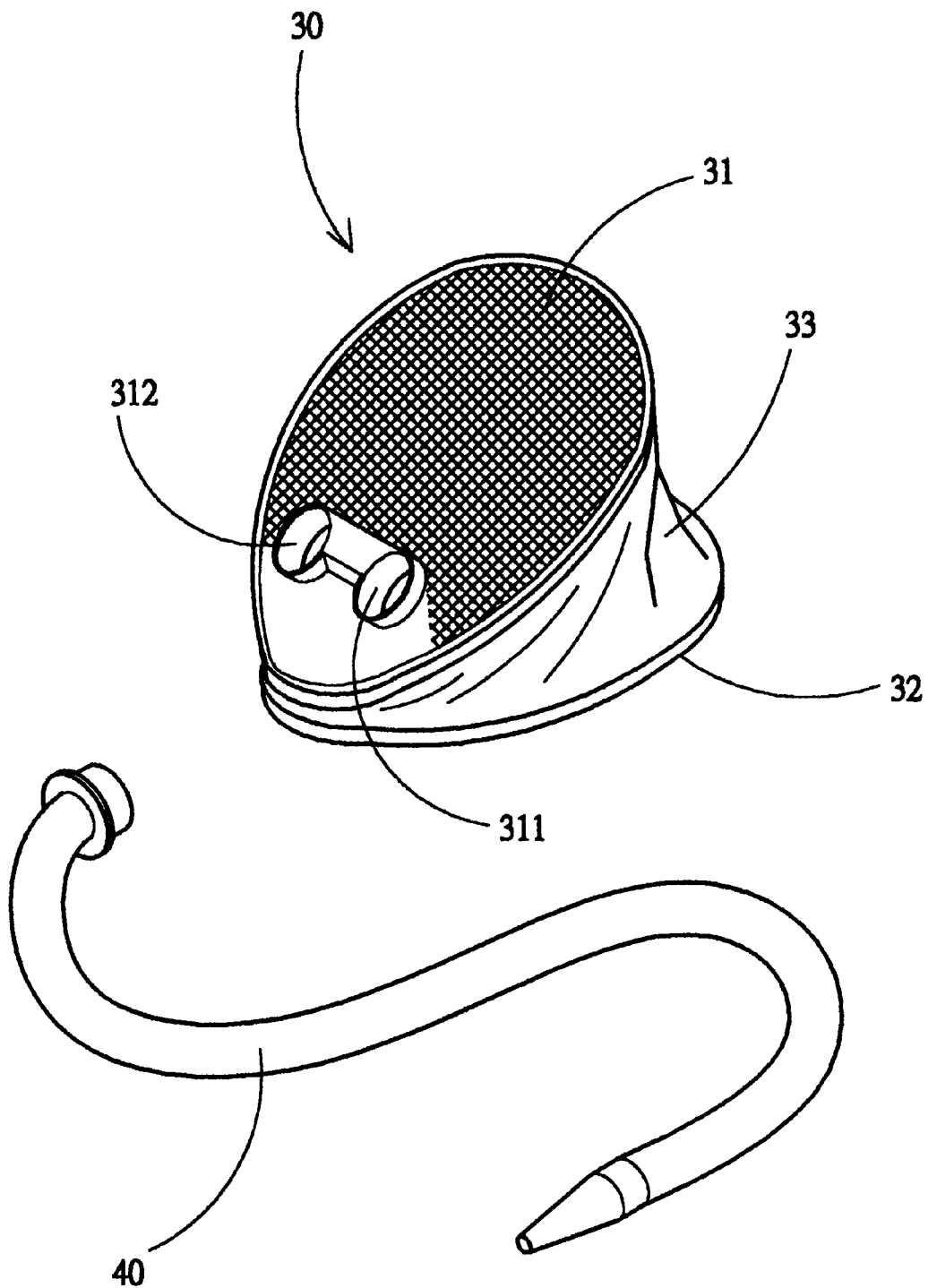
FIG. 5 illustrates a foot pump according to the present invention.
Figure 6B:
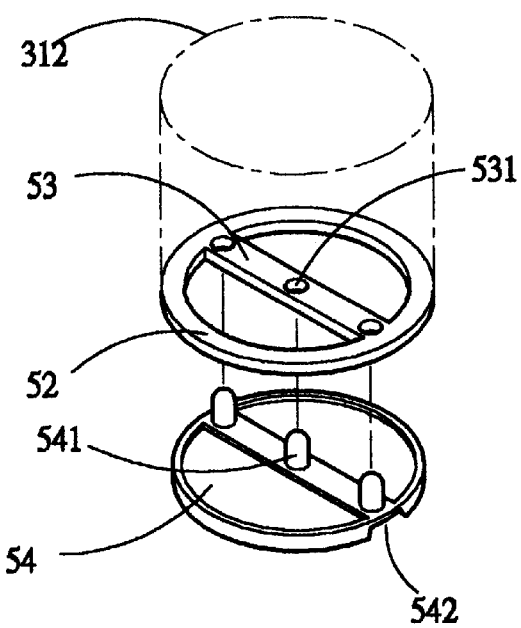
FIG. 6B is an exploded view of an one-way air valve for installation in the air inlet of a foot pump according to the present invention.
Figure 6A:
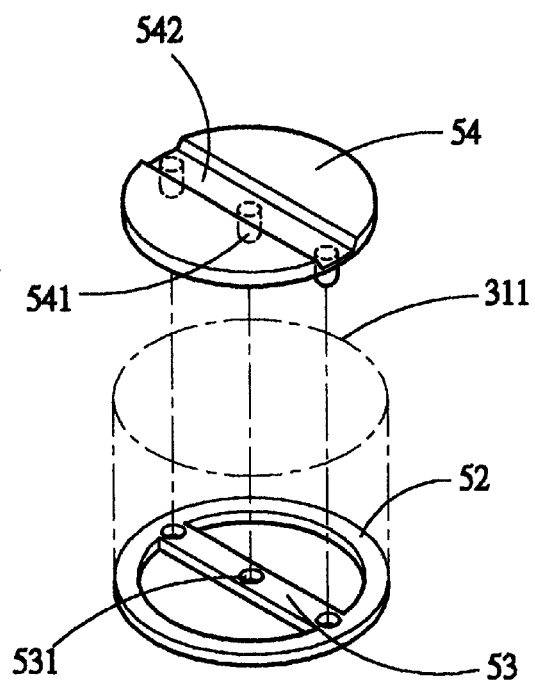
FIG. 6A is an exploded view of an one-way air valve for installation in the air outlet of a foot pump according to the present invention.

Referring to FIGS. 5, 6A and 6B, two one-way air valves are respectively mounted in the air outlet 311 and air inlet 312 at the foot plate 31 of a foot pump 30. The foot plate 31 is coupled to a bottom plate 32 by a soft, collapsible coupling member 33. The foot plate 31, the bottom plate 32 and the soft collapsible coupling member 33 define an air accumulation chamber. Further, a flexible air nozzle tube 40 is connected to the air outlet 311 for guiding compressed air out of the foot pump 30 to an inflatable article. The one-way air valves each comprise an annular flange 52 integral with the peripheral wall of the air inlet 312 or air outlet 311, a transverse bar 53 suspended in the annular flange 52, the transverse bar 53 having a plurality of mounting holes 531 spaced along its length, and a valve flap 54 fastened to the transverse bar 53 to close/open the air passage through the annular flange 52. The valve flap 54 has a plurality of mounting rods 541 arranged in a line at one side and respectively tightly plugged into the mounting holes 531 at the transverse bar 53, and a transverse bottom groove 542 at an opposite side corresponding to the mounting rods 541. The two one-way air valves are respectively installed in the air inlet 312 and the air outlet 311 in reversed directions.

It is to be understood that the drawings are designed for purposes of illustration only, and are not intended as a definition of the limits and scope of the invention disclosed.

What the invention claimed is:

1. An air valve for fastening to an inflatable article comprising:

a valve body shaped like a short tube, said valve body comprising an outside annular flange extending outwardly, perpendicularly around the central portion of the periphery thereof, an inside annular flange raised around an inside wall thereof on the middle and defining an air passage, a transverse bar suspended in said inside annular flange, a plurality of mounting holes spaced at said transverse bar, and pairs of locating blocks symmetrically arranged at two opposite sides of said transverse bar;

a valve flap coupled to said valve body to close said air passage, said valve flap comprising a plurality of upright mounting rods arranged in a line corresponding to said transverse bar and respectively tightly plugged into the mounting holes at said transverse bar of said valve body from a bottom side, and a transverse bottom groove at a bottom surface thereof corresponding to said transverse bar of the valve body; and a movable plate coupled to the locating blocks of said valve body and moved up and down within a limited distance, said movable plate having a plurality of vertical sliding slots symmetrically arranged at two opposite side walls thereof and respectively coupled to the locating clocks at said transverse bar of said valve body;

wherein said valve flap is forced by said movable plate to fold downwards in opening said air passage when said movable plate is forced downwards toward said transverse bar by an external force; said valve flap returns to close said air passage when the external force is released from said movable plate.

2. The air valve of claim 1 further comprising a valve cover attachable to said valve body to close said air passage.

3. The air valve of claim 2 wherein said valve body comprises an outer thread, and said valve cover comprises an inner thread threaded onto the outer thread of said valve body.

4. The air valve of claim 3 wherein said valve cover comprises an inside center rod, and a gasket mounted on the inside and fastened to said inside center rod by a clamp.

* * * * *